United States Patent

Shanrock

[15] 3,703,626

[45] Nov. 21, 1972

[54] DOCUMENT TRANSPORT APPARATUS AND METHOD

[72] Inventor: Raymond L. Shanrock, Sunnyvale, Calif.

[73] Assignee: Data Recognition Corporation, Palo Alto, Calif.

[22] Filed: Dec. 14, 1970

[21] Appl. No.: 97,976

[52] U.S. Cl. ....................235/61.11 R

[51] Int. Cl. ....................G06k 13/26

[58] Field of Search..235/61.11 R, 61.11 C, 61.11 D, 235/61.11 E, 61.12 M; 250/219 R, 219 DC

[56] References Cited

UNITED STATES PATENTS

| | | | |
|---|---|---|---|
| 2,583,666 | 1/1952 | Pitman | 235/61.11 C |
| 3,484,587 | 12/1969 | Richardson | 235/61.11 R |

*Primary Examiner*—Daryl W. Cook
*Attorney*—Flehr, Hohbach, Test, Albritton & Herbert

[57] ABSTRACT

In a document transport apparatus for feeding documents along a path including means for sensing the data carried by the documents, as where the data carried by the document extends in lines across a portion of the document, means for feeding the document to register one of the lines of data with the sensing means so as to read the data. Means for repositioning the document to serve to re-register another of the lines of data with the sensing means for sensing the data in another of the lines. In a particular embodiment, after the sensing means has detected the absence of data in a given line, the document is reversely fed along its path to a position where it can be repositioned for registering a second line of data with the sensing means so as to detect data in the last named line. Repositioning is accomplished by moving a registration guide element or fence from one position to another and then engaging the edge of the document with the guide element while the sensing means remains located at a stationary position. A method is disclosed which carries out the steps of the above functions.

5 Claims, 10 Drawing Figures

INVENTOR.
RAYMOND L. SHANROCK

BY Fehr, Hohbach, Test, Albritton & Herbert
ATTORNEYS

INVENTOR
RAYMOND L. SHANROCK
BY
Flehr, Hohbach, Test, Albritton & Herbert
ATTORNEYS

INVENTOR
RAYMOND L. SHANROCK

BY Flehr, Hohbach, Test, Albritton & Herbert
ATTORNEYS

INVENTOR.
RAYMOND L. SHANROCK

BY Flehr, Hohbach, Test, Albritton & Herbert
ATTORNEYS

INVENTOR.
RAYMOND L. SHANROCK

BY

Flehr, Hohbach, Test, Albritton & Herbert
ATTORNEYS

DOCUMENT TRANSPORT APPARATUS AND METHOD

BACKGROUND OF THE INVENTION

This invention pertains to a document transport apparatus and method for feeding same, such as data cards and the like along a path including means for sensing the data imprinted or recorded on the card. The apparatus is particularly useful in optically scanning alphanumeric characters printed on the data card in a manner to extend in a line across a portion of the card.

In apparatus of the type for "reading" alphanumeric and other characters from a data card, it is desirable that one machine be capable of reading the data from the cards as they pass through the machine, notwithstanding the fact that the data may be variously located on the card. Thus, for example, in a specific instance as where a sales invoice is imprinted by means of a credit card used with a credit card imprinter, a number is typically applied to the sales invoice. Inasmuch as the source or sponsor of the credit card being used need not always be the same, the location of the number imprinted upon the invoice may vary with the different types of imprinters used and with different sponsors' credit cards employed.

Accordingly, the typical scanning mechanisms for optically reading alphanumeric characters which read one line of print at a time will not necessarily be aligned with the line of print applied to the invoice if its position is sometimes located in one line, and at other times, located in a different line. The foregoing creates, in general, a handling problem requiring pre-sorting of the cards whereby all cards having the identifying number located in one line or "track" of the card will be fed at one time, and then after feeding these cards, the machine can be adjusted to move the sensing mechanism into a new position so as to permit the cards having the identifying number located in a different track of the card to be fed at a different time.

Thus, there is a need to provide a mechanism for reading alphanumeric characters printed upon a card in various lines without the requirement that the card be pre-sorted before being fed into the reading apparatus, as well as a need to provide stationary sensing means in a manner whereby a number of data lines can be scanned, one at a time.

SUMMARY OF THE INVENTION AND OBJECTS

In general, in card transport apparatus for feeding data cards along a path including means to sense or read the data carried by the card and wherein the data carried by the card extends in lines across a portion of the card, means have been provided for feeding a card aligned to register one of the data lines with the sensing means so as to sense the data disposed in one of the lines. Means have further been provided for repositioning the card so as to register another of the data lines of the card with the sensing means for sensing data in the other line. In this way, the sensing means will encounter and read the data regardless of which line contains the data.

In a preferred embodiment, means have been provided for feeding the card reversely along the path subsequent to sensing at least a portion of the first line being read, together with means for repositioning the card so as to align another of the data lines in registration with the sensing means where the sensing means fails to detect alphanumeric or other characters in the first line. Subsequently, the card is re-fed along the sensing path so as to sense the data in the second line. When the data has been properly sensed, the card is ejected from the reading machine.

In general, it is an object of the present invention to provide an improved card reading machine and method for alphanumeric or other characters, or data in a form to be carried on a card in a position for means to sense the data on the card.

It is another object of the invention to provide a card reading machine and method for optically sensing alphanumeric characters disposed in one or another of a plurality of lines or locations extending across a data card.

It is yet another object of the invention to provide an improved alphanumeric character reading machine utilizing stationary optical scanning means wherein a plurality of data lines extending across the card can be scanned by the stationary optical scanning mechanism sequentially.

The foregoing and other objects of the invention will be more readily apparent from the following detailed description of a preferred embodiment when considered in conjunction with the drawings.

DETAILED DESCRIPTION OF A PREFERRED EMBODIMENT

Figures 1, 2:
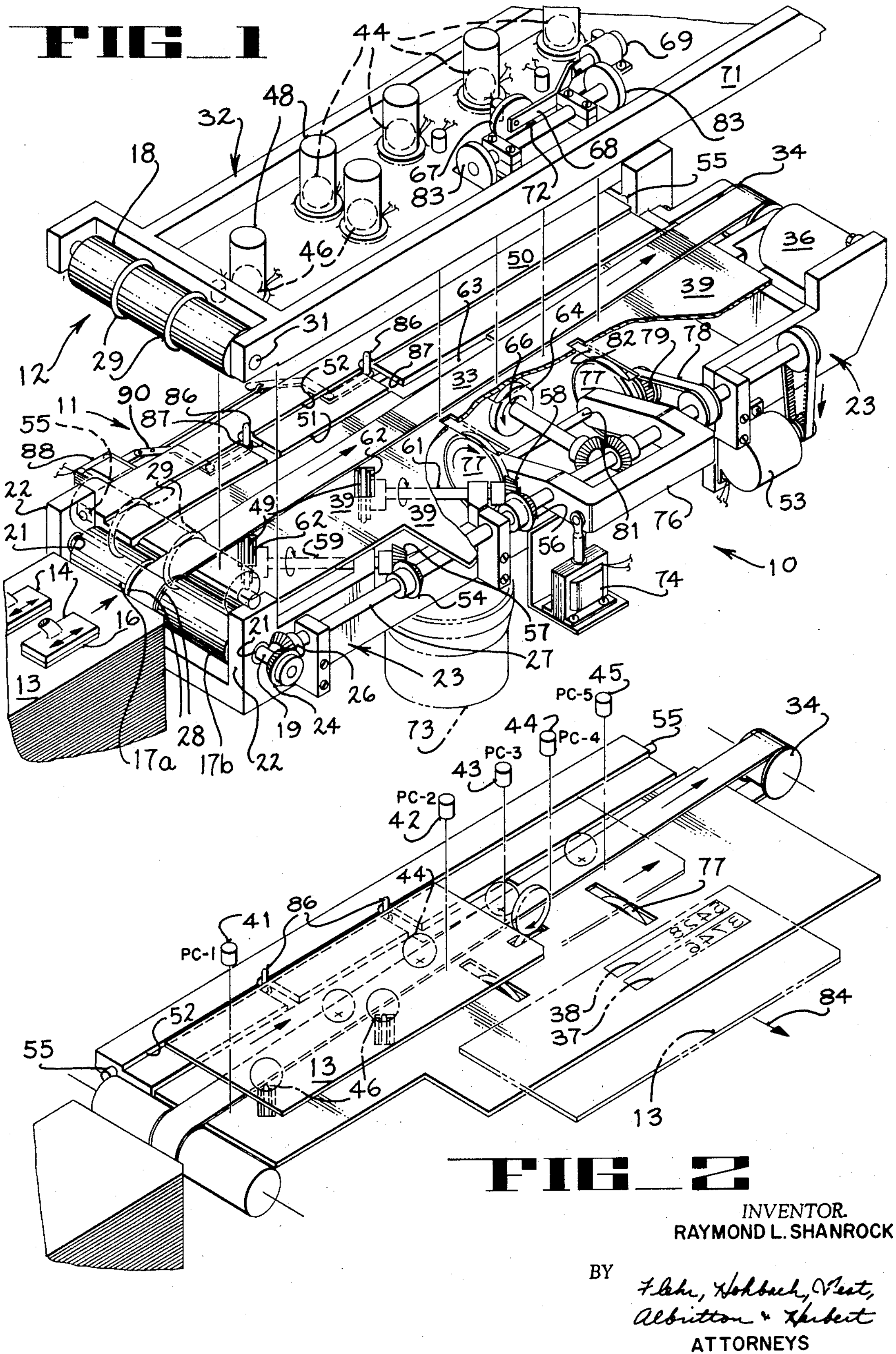
FIG. 1 is a diagrammatic exploded perspective view, partially broken away, of a card feeding apparatus according to the invention.
FIG. 2 is a diagrammatic perspective view of the lower bed portion of card feeding apparatus according to the invention diagrammatically illustrating the movement of a data card through the apparatus in registration with a first registration edge.

A card transport machine 10 comprises, generally, a lower transport assembly 11 and an upper transport assembly 12. Upper transport assembly 12 is arranged by suitable means, such as hinges or the like, for being carried directly above lower transport assembly 11 in closely spaced relation for feeding data cards 13 therebetween. Conventional means, not a part of the present invention, as schematically indicated by the feeding feet 14 prepared with an adherent friction sole 16 of foam rubber or the like, is operated in conventional style so as to engage the upper surface of the top card in a stack of cards and advance the top card into the nip formed between a pair of feed rolls 17, 18. Feed roll 17 is carried upon an axle 19 journalled by bearings 21 disposed in a pair of upstanding ears 22 constituting a portion of the lower transport assembly bed or frame 23.

Feed roll 17 is the driving roll and is driven by means of a pair of bevelled gears 24, 26, in mesh, and disposed on the ends of their respective axles 19, 27. Axle 27 is the main drive axle and serves to rotate at high speed to operate various components yet to be described.

Feed roll 17 consists of a pair of high speed driving portions 17a, 17b pinned to rotate with drive shaft 19. Portions 17a, 17b are disposed in flanking relation to a flanged low speed idler roll 28 mounted on bearings (not shown) for independent rotation about axle 19 whereby a carrier belt 33 can be driven at low speed from motor 36. Roll 18 is supported for free rotation upon an axle 31 mounted for rotation in the protruding ends of the upper transport assembly carriage plate 32.

Means for engaging and feeding a card 13 along a predetermined path through machine 10 is characterized by the cyclically trained carrier belt 33 of high friction material trained at one end about flanged idler 28. At its other end belt 33 is trained about a flanged drive pulley 34 supported to rotate with the stub shaft of a low speed drive motor 36 carried by frame 23.

In general, the card feeding mechanism 14 serves to feed one card at a time in conventional style into the nip of drive rolls 17, 18 whereby the short edge of the data card enters the nip first with the card face down, i.e., the printed or imprinted surface being disposed in confronting relation to the top deck surface 39 of frame 23. Accordingly, it is to be assumed (FIG. 2) that an identification number or the like will be imprinted in one or the other of two fields 37, 38 as shown in FIG. 2 where the topmost line of data or "track" includes the number "5428" while the more centrally located line or "track" of data includes the identifying number "3746."

The top carriage plate 32 supports a number of photoresponsive units 41 of a type containing both a light source and a light-sensitive element so that the presence of reflected light from a data card will indicate the presence of a data card thereunder as distinguished from the nonreflected light or "dark" condition as exists in the absence of a data card. In this regard, the top surface of deck 39 is treated as with a suitable dark light-absorbent paint to enhance the contrast between the presence or absence of a data card beneath the units 41–45. As shown in the graphs of FIGS. 7—10, these photoresponsive units 41–45 are respectively identified as PC1, PC2, PC3, etc. for convenience. Similar designation has been associated with each unit in FIGS. 2, 3 and 4, as well as reference numerals 41–45.

Thus, as will be seen further below from additional explanation herein with respect to the graphs in FIGS. 7-10, units 41–45 serve to identify the presence or absence of a card at various positions in its travel for activating controls of the system shown in FIG. 6, all as to be described further below.

Figure 3:
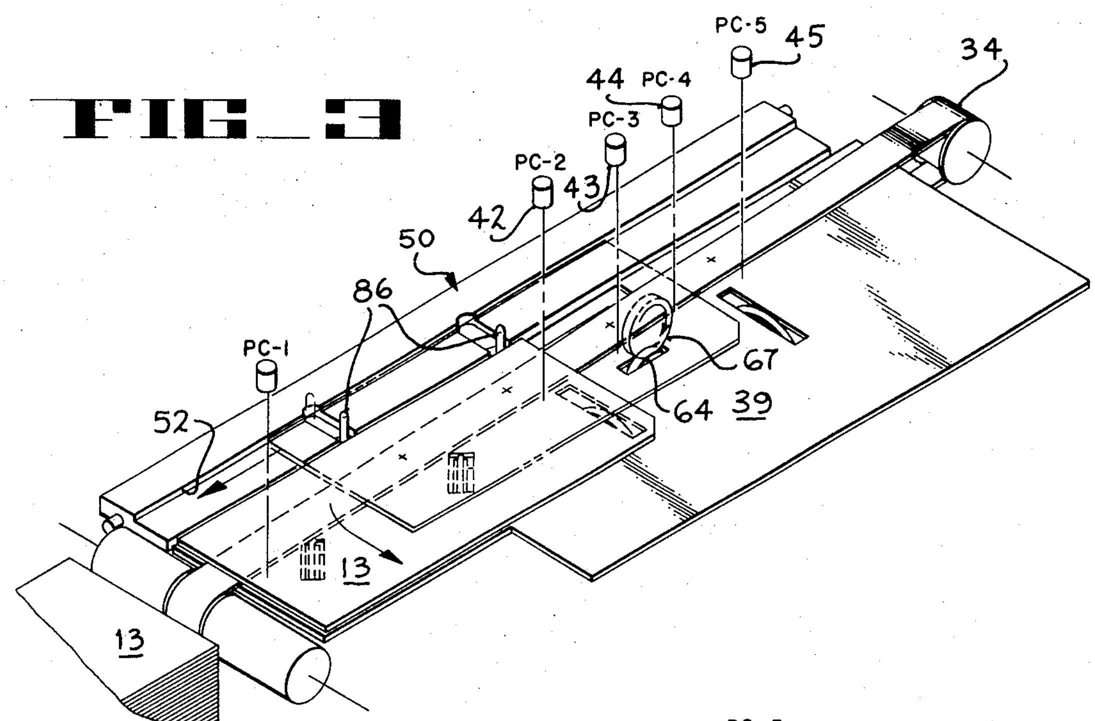
FIG. 3 is a view similar to FIG. 2 illustrative of the repositioning of a data card in registration with respect to a second registration edge.

Carriage plate 32, in addition, is provided with two groups of steel spherical balls 46, 47, each ball being contained within an electromagnetic housing 48 whereby, upon energizing an electromagnetic coil disposed within housing 48, its associated ball 46, 47 will be raised upwardly into the housing. Upon de-energizing the electromagnetic coil (not shown) within housings 48, the steel balls 46, 47 will drop downwardly to a position where they can press downwardly upon the periphery of the rubber-tired high speed drive wheels 49 (in the case of balls 46) or upon the upper surface of the cyclic carrier formed by belt 33. Accordingly, (as shown in FIG. 3) balls 47, when their associated coils are de-energized, will press a card against belt 33 in the position marked with "X's" at 47*a*.

It is to be observed that high speed drive wheels are journalled by suitable means whereby the plane of rotation of each of the wheels 49 is canted at an angle to the path of movement of each data card 13 as it moves through the machine. In this way, when a data card is present above wheels 49 and the steel balls 46 (referred to hereinafter as the "high speed balls" and in FIGS. 7-10 as HSB) have been dropped downwardly onto the upper surface of the data card, the drive wheels 49 will quickly urge the upper longitudinal edge of the card into registration with one or the other of two registration edges 51, 52 of a movable guide element 50.

The drive axle 27 is rotated by means of a drive motor 53 whereby the bevelled gears 54, 56 serve to rotate their associated driven gears 57, 58 and axles 59, 61, as well as the driving hub portion of high speed drive wheels 49, are all located below top deck surface 39. A chordal portion of each of the two high speed drive wheels 49 is exposed, however, to extend upwardly through surface 39 via windows 62.

Briefly, to this point, there has been described a machine wherein the cards 13 fed into the nip defined between feed rollers 17, 18 enters onto the upper surface of a cyclically driven belt 33 and, in the event that the electromagnets associated with high speed balls 46 have been de-energized, these balls 46 will ride against the upper surface of the card so as to press it against high speed drive wheels 49. Wheels 49 then serve to urge the card's longitudinal upper edge against one or the other of the two registration edges 51, 52 (as further described below). Low speed balls 47, when their associated coils are de-energized, serve to press against the upper surface of the card so as to cause the card to firmly engage the upper surface of belt 33.

As thus arranged, it will be readily evident that with card 13 disposed as shown in FIG. 2 the top track field 38 will pass across the sensing window 63 or reading zone whenever the card is registered against edge 51. On the other hand, when the longitudinal upper edge of card 13 is registered against edge 52, it will be evident that the center track field 37 will pass across the reading zone defined by sensing window 63. Thus, each of two fields can be scanned without adjustment to the scanner 73 (FIG. 6) disposed to read the data via window 63.

Means for keeping a card carried by belt 33 in a "-waiting" state until it is desired to scan the data of the card comprises a driving scan wheel 64, operating in the direction of arrow 66. The periphery of wheel 64 protrudes upwardly slightly above the surface of deck 39 through an opening for cooperation with a resilient follower roller 67. Roller 67, carried upon the end of a bell crank lever arm 68, operates between raised and lowered positions by energizing and de-energizing a solenoid 69.

Thus, roller 67 penetrates through the carriage plate 71 via opening 72 therein. Accordingly, upon de-energizing solenoid 69, roller 67 drops downwardly to engage the driving surface of scan wheel 64. In this condition, the nip formed between the two rollers 64, 67 prevents entry of a card therebetween. However, upon energizing solenoid 69 to relieve the pressure on card 13, card 13 carried upon belt 33 will advance and pass over the reversely turning scan wheel so as to carry one or the other of the two fields 37, 38 across the scanning zone 63.

Beneath scanning zone 63, an optical character-scanning system of suitable design represented simply by the element 73, such as are conventionally employed in this technology or, for example, as shown and described in copending application, Ser. No. 14,257, assigned to the assignee herein, serves to sense the characters disposed in fields 37 or 38. After reading one or the other of the two fields 37, 38 and by the time the leading edge of the card 13 encounters the light beam of PC5, an exit solenoid 74 is energized to pivot a yoke 76 in a manner to raise high speed exit wheels 77 driven by means of the toothed drive belt 78 and flanged pulley 79 mounted upon the end of a drive shaft 81 which carries wheels 77. Wheels 77 extend upwardly through the slots 82 so as to engage the follower rollers 83 also extending downwardly through plate 71. In this way, a high speed exit nip is formed between rollers 77, 83 to engage the card and move it out of the apparatus in the direction of arrow 84 (FIG. 2).

Means have been provided for repositioning a card in the event that no characters are sensed in one or the other of the two fields 37, 38 so that the other of the two fields can be read by the scanning means 73.

Figures 4, 5:
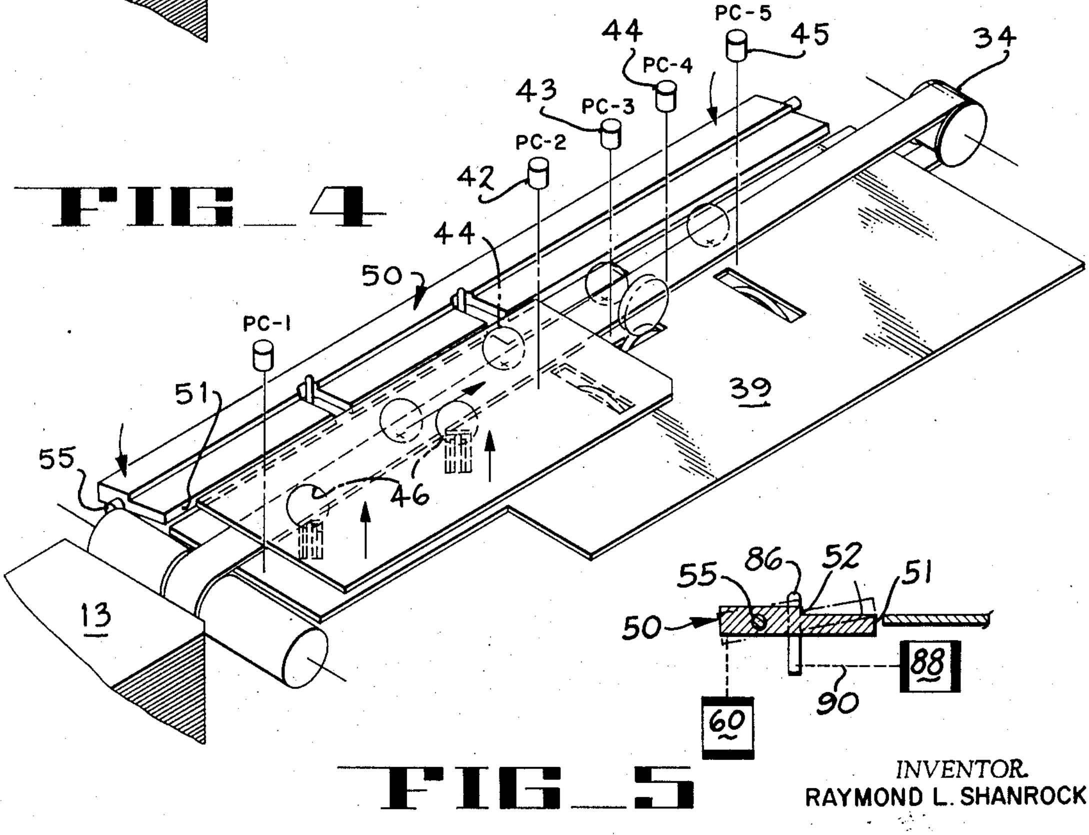
FIG. 4 is a view similar to FIG. 3 wherein fingers for urging a card outwardly and away from the first registration edge have been withdrawn and the data card disposed in registration with the second registration edge as shown in FIG. 3.
FIG. 5 is an enlarged detail end elevation view of a portion of the apparatus shown in FIG. 2.

Thus, the guide element 50 has been mounted to pivot upon an axis (defined by the pivot pins 55) between advanced (elevated) and retracted (lowered) positions as shown best in FIG. 5. Thus, a solenoid 60 mechanically coupled to the rear of element 50 operates in a manner whereby, upon energizing solenoid 60, element 50 pivots counter-clockwise about the axis of pivot pins 55 to lift registration edge 51 upwardly, as shown in phantom lines in FIG. 5. When solenoid 60 has been deenergized, element 50 rocks clockwise whereby registration edge 51 is disposed at a lower position.

In general, and having the above described apparatus in mind, where it is desired to first scan field 38 disposed in the "top track" of a card 13, card 13 will be carried by the movement of belt 33 along a path which ultimately encounters scanning zone 63. In the event that the scanning system 73 fails to detect characters present in field 38 within a reasonable time after entry, follower roller 67 is dropped by de-energizing solenoid 69 so as to capture card 13 in the reverse driving nip formed between rollers 64 and 67. Also, at the same time, the low speed balls 47 are lifted by energizing their respective electromagnets and, as will be seen further below, the high speed balls 46 are already in a lifted condition by virtue of energizing the electromagnets associated therewith.

Accordingly, this leaves the upper surface of card 13 unobstructed and free of downward pressure so as to be able to be driven quickly reversely along the path of its normal feeding movement. Card 13 is driven leftwardly, as shown in FIG. 1, until the left edge of the card engages the positively driven feed rolls 17, 18.

The reverse feeding and repositioning of card 13 against a second registration edge in association with the card permits the card to be scanned at a different field 37, namely, the so-called "center track." Thus, after card 13 has been moved well to the left, the high speed balls 46 are dropped by de-energizing their respective electromagnets and solenoid 60 associated with guide element 50 is de-energized to cause registration edge 51 to drop below the level of plate 39 thereby exposing edge 52. In this fashion, the high speed balls 46 serve to urge the card further laterally across its previous path and ultimately into engagement with registration edge 52. At that point, card 13 is advanced by lowering the low speed balls 47 and raising the high speed balls 46 so that belt 33 can carry card 13 along its scanning path to ultimately cause center track field 37 to pass across scanning zone 63.

On the other hand, in the event that it is desired to mainly feed the cards in a manner so as to first look for information recorded in the center track field and then, if no alphanumeric or other characters are detected in field 37, to re-feed the card so as to detect any characters located in field 38, fingers 86 have been provided in slots 87 formed in guide element 50. Fingers 86 are supported for movement by a suitable linkage 90 whereby they can move between retracted and advanced positions under action of a solenoid 88 (FIGS. 1 and 6) and thereby move any card located adjacent fingers 86 laterally outwardly beyond registration edge 51.

In general, where the mode of operation is to first scan for alphanumeric characters recorded in center track field 37 and reposition the card if no characters are found so as to scan for the presence of characters in the top track field 38, it will be readily evident that, as the scanner detects the absence of characters recorded in field 37, the card will be returned as described above by means of de-energizing solenoid 69 so as to drop the follower roller 67 downwardly to cooperate with scan wheel 66. Upon being returned fully leftwardly along its path, solenoid 88 (operating fingers 86) causes fingers 86 to be moved in their slots to urge card 13 away from registration edge 52 and slightly beyond registration edge 51. At that point, high speed balls 46 are permitted to drop and cooperate with the high speed drive wheels 49 for angularly urging card 13 into registration with edge 51.

Subsequent scanning is then conducted and, after detecting characters in top track field 38, the card is ejected from the machine 10 in the manner described above.

Figure 6:
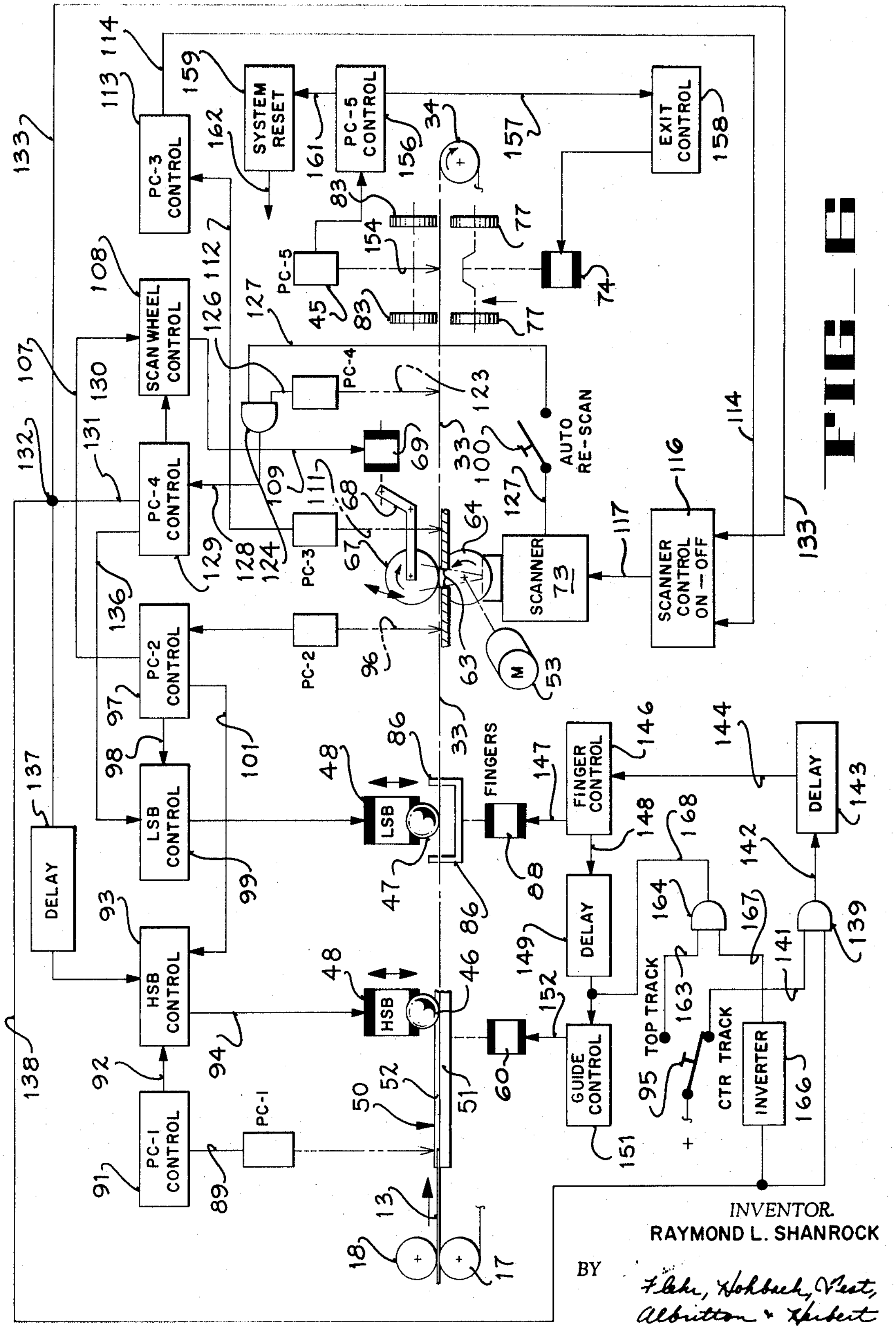
FIG. 6 is a system diagram for operation of the apparatus shown in FIGS. 1–5.
Figure 7:
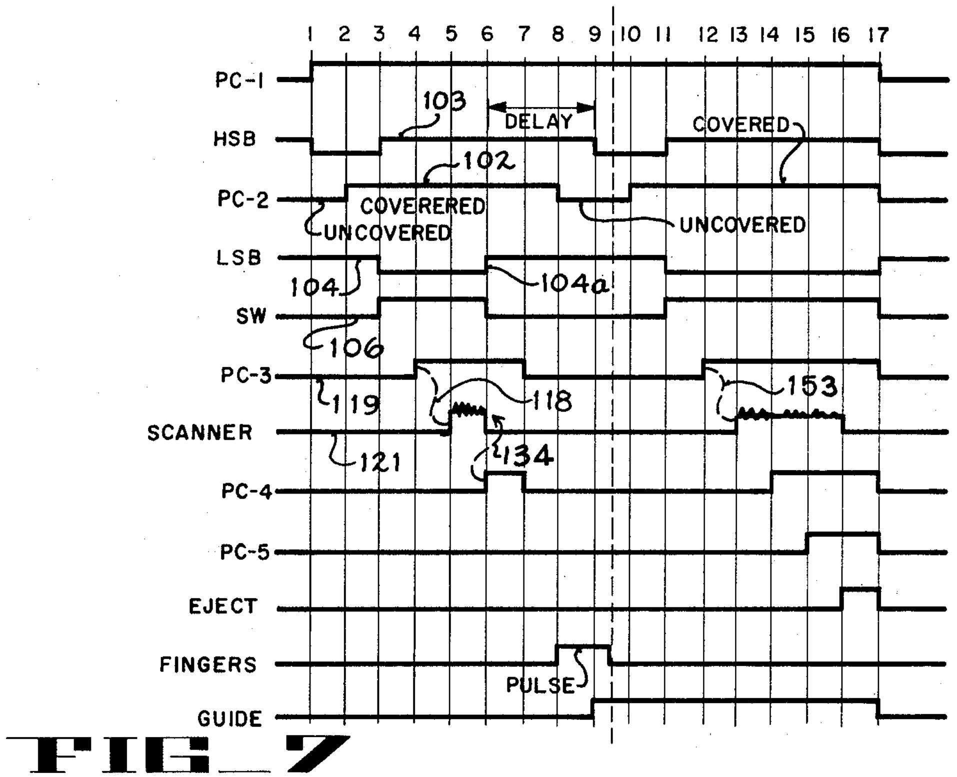
FIG. 7 is a graph of various events indicating the various functions of components of the system disclosed in the above figures for that mode of operation of the system wherein a document or card is first fed so as to read alphanumeric characters recorded in a centrally located line (i.e., "center track"), and then upon detecting the absence of alphanumeric characters in such line, the card is re-fed in position so as to scan an uppermost line (i.e., "top track") to determine whether or not the alphanumeric data is present in such top track.
Figure 8:
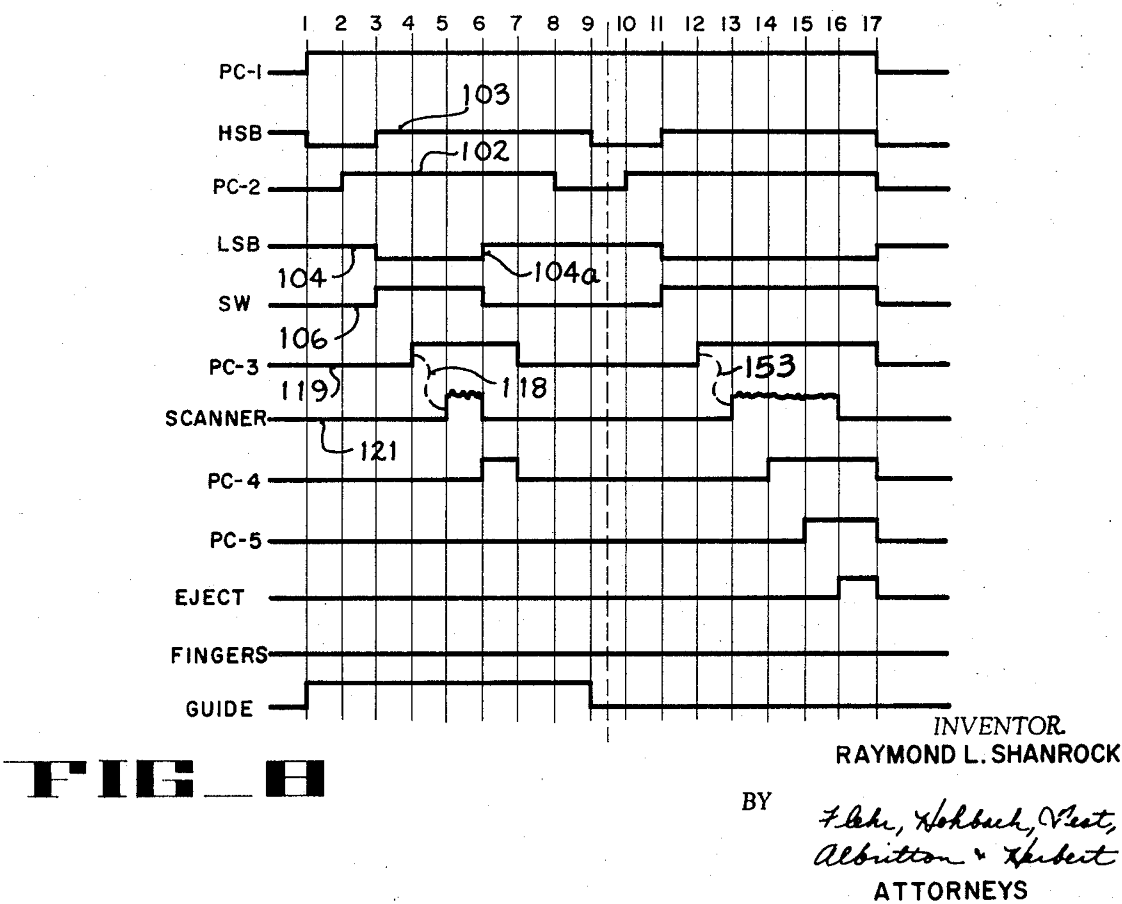
FIG. 8 is a graph of various events indicating the various functions of components of the system disclosed in the above figures for that mode of operation of the system wherein a document or card is first fed so as to read alphanumeric characters recorded in a top mode line (i.e., "top track"), and then upon detecting the absence of alphanumeric characters in such line, the card is re-fed in position so as to scan a centrally located line (i.e., "center track") to determine whether or not the alphanumeric data is present in such center track.
Figure 9:
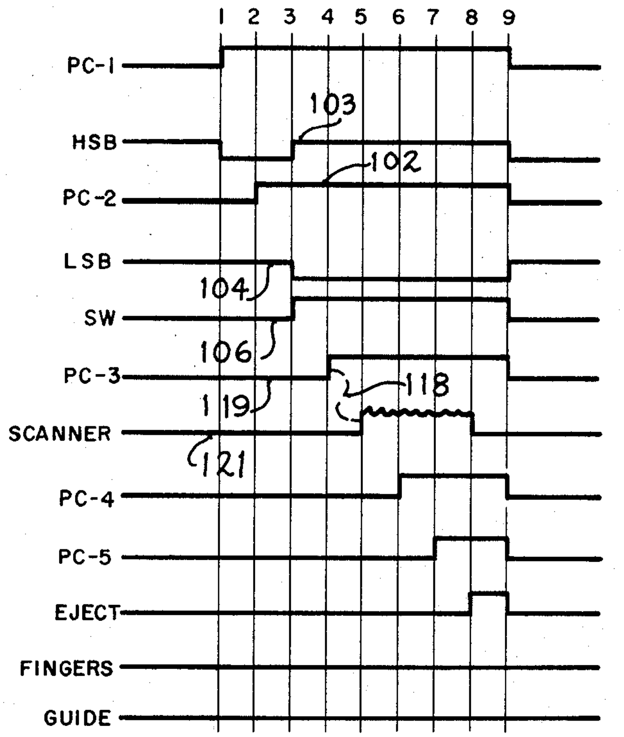
FIG. 9 is a graph of various events indicating the various functions of components of the system disclosed in the above figures for that mode of operation of the system wherein a document or card is fed so as to read alphanumeric characters recorded in a centrally located line (i.e., "center track"), and then upon detecting the presence of alphanumeric characters in such line, the card is discharged from the system.
Figure 10:
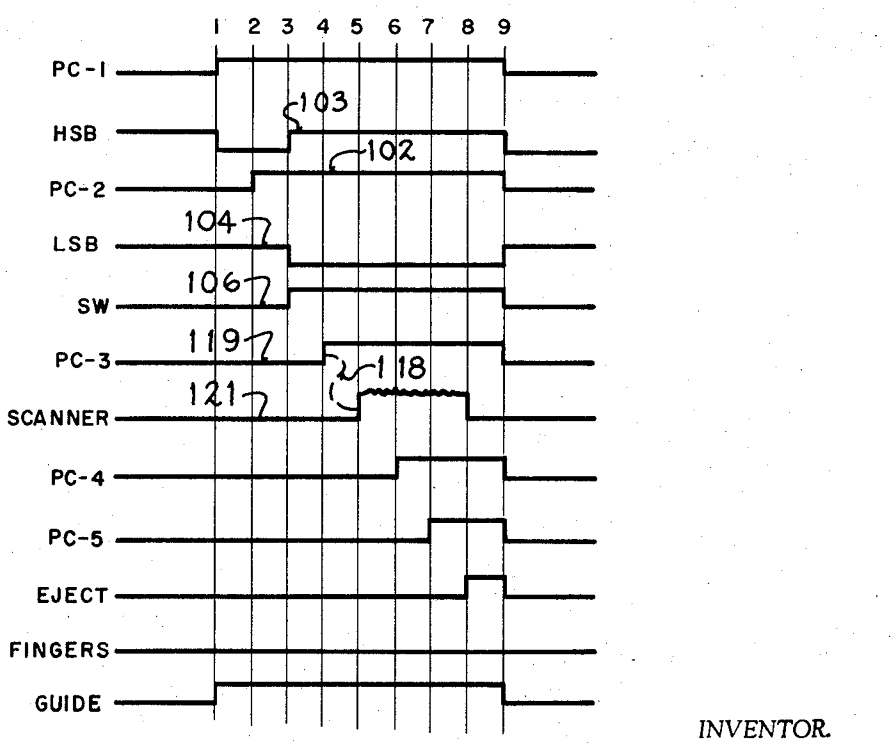
FIG. 10 is a graph of various events indicating the various functions of components of the system disclosed in the above figures for that mode of operation of the system wherein a document or card is fed so as to read alphanumeric characters recorded in a topmost line (i.e., "top track"), and then upon detecting the presence of alphanumeric characters in such top line, the card is discharged from the system.

Having in mind the foregoing general operating procedure pursued by the apparatus described, the system disclosed in FIG. 6 can be explained in conjunction with each of the four different modes of operation represented by the sequence charts shown in FIGS. 7, 8, 9 and 10. These charts respectively describe a mode of operation wherein the center track field 37 is first scanned and then a re-scan is made of the top track field 38. FIG. 8 shows the sequence chart for the mode of operation wherein the top track field 38 is first scanned and then a re-scan occurs through the center track field 37. FIG. 9 discloses the mode of operation wherein the center track field 37 is scanned and characters are detected as present and no rescan occurs. FIG. 10 similarly discloses the sequence for the mode of operation wherein characters are present in the top track field 38 and it is initially scanned without requirement of a re-scan of the other field.

With reference to FIGS. 7–10, the sequence of operations essentially occurs in the order indicated from left to right as "times" 1, 2, 3, etc. up to "time" 17. While the spacing between each vertical line representative of a given time period is shown as equal, it is not intended that these equal spacings represent equal periods of elapsed time.

Also, in general, where the trace of a given function drops, the physical element associated with that trace or represented by that trace also physically drops. In the case of the photocells involved where their respective traces rise, it indicates that the light path for that particular photoresponsive unit has been intercepted by the card and light is thereby reflected from the card back to the photoresponsive portion of the related unit.

Having in mind the mode of operation wherein a center track field 37 is first scanned and then, upon sensing the absence of recorded alphanumeric characters in that particular field, the card is repositioned so that a top track field 38 can be scanned, all as represented by the chart in FIG. 7. Having reference to FIG. 6 the system functions substantially as follows:

In the foregoing mode of operation, it is to be assumed that a control switch 95 is movable between a "-center track" mode of operation as indicated in FIG. 6 and a so-called "top track" mode of operation. It is also to be understood that the control switch 100 when closed places the system in the above modes for providing automatic re-scanning of cards where a field shows no characters to be present therein upon the first scan through the system.

PC1, upon sensing the presence of card 13, causes the high speed balls 46 to drop and advance the card into edge-guided relation with registration edge 52. It will be recalled that in this mode of operation, solenoid 60 will be initially de-energized so that registration edge 52 is the functional registration edge at that moment.

As shown in FIG. 6, PC1 feeds signals along a line 89 into a suitable control element or circuit 91 of a type providing an output signal on lead 92 effective to de-energize the high speed ball control 93 so as to inactivate line 94. The type of control device or circuit utilized for PC1 control 91 and high speed ball control 93 can be any one of a number of suitable arrangements well known to those skilled in the art to provide the function indicated. For example, suitable logic can be provided simply by employing amplification of the signals from PC1 so that the output on line 92 can be effective in changing the state of lead 94. High speed ball control 93 similarly can utilize simple logic involving, for example, typical arrangements of flip-flops, inverter circuits and the like, to achieve a de-energized state of the electromagnet associated with high speed balls 46 in response to the input signal on line 92.

Having dropped high speed balls 46 (at time 1 FIG. 7), the card 13 will advance along its path until the light path of PC2 has been intercepted at time 2. The position of the beam associated with PC2 is such that, at the normal card speed, scan wheel 67 will have been lifted whereby the card will travel smoothly along its path without interruption.

Accordingly, upon intercepting the beam 96, PC2 generates a control signal to a control logic box 97 whereby an output signal on line 98 serves to de-energize the low speed balls 47 via a low speed ball control unit 99 of suitable construction similar to the high speed ball control unit 93. In addition, the output from PC2 to control logic 97 is fed via line 101 to operate high speed ball control unit 93 in a manner whereby high speed balls 46 will be lifted, i.e., the coil of low speed ball housing 48 will be switched off by means of the input on line 98 all in known style. Suitable switching circuitry is readily available and will be evident to those skilled in the art for use in conjunction with low speed ball control unit 99 in response to an input signal on line 98.

Accordingly, at time 3 as shown in FIG. 7, PC2 will be covered as indicated by the elevated level of trace 102; high speed balls will have been lifted as indicated by the upwardly directed step in trace 103; and low speed balls 47 will have dropped as shown by the step at time 3 in trace 104.

In addition to the foregoing, as indicated by the first step shown in trace 106, the scan wheel 67 will be lifted by virtue of energizing solenoid 69 as shown in FIG. 6. Thus, upon intercepting the light path 96 of PC2, PC2 control logic 97 provides a further output on line 107 so as to provide a control signal to the scan wheel control 108. Scan wheel control 108 can, as noted above with respect to high speed ball logic 93, low speed ball logic 99 and other switching control units be simply arranged whereby power can be switched on and off with respect to an output line 109 coupled to solenoid 69. Thus, by lifting scan wheel 67 as shown on trace 106, the card is permitted to advance at least partially into the region of the scanning zone 63 provided in the path of one or the other of the two fields 37, 38 to be read.

As the card encounters the light path 111 of PC3, scanner 73 will be switched ON by a signal transmitted along the line 112 into a switching control unit of conventional design 113 and thence along line 114 to a section of scanner 73 arranged for switching the scanner ON to commence scanning of characters in zone 63. This on-off control for scanner 73 is designated 116 and, again, can constitute simply a flip-flop arrangement whereby an output is fed to line 117 to activate scanner 73.

The foregoing relationship of activating scanner 73 by interception of light path 111 of PC3 is represented simply by the dashed line 118 interconnecting traces 119, 121 of PC3 and the scanner respectively.

Accordingly, scanner 73 commences its function of scanning the zone 63 to detect the presence of alphanumeric or other characters and this has been represented at wave form 122 in FIG. 7.

In view of the fact that the charting of FIG. 7 assumes that characters are not present in the center track field 37, wave form 122 continues only for a relatively short period as indicated on FIG. 7, i.e., continuing only until time 6. By this time, the card advancing along its direction of travel intercepts light path 123 associated with PC4. In the event that no character has been detected by scanner 73, prior to encountering the light path 123 of PC4, the input from PC4 together with an input from scanner 73 indicating no character being present in the field combine to activate the system to reversely feed card 13 along its prior direction of travel.

Accordingly, AND gate 124 receives an input via lead 126 from PC4 and a second input via lead 127 derived from scanner 73 indicating the absence of any characters in the field being scanned subsequent to having activated scanner 73 via input from line 117. Accordingly, the output 128 from AND gate 124 will occur only in response to the conjoint action of (1) the sensing of a card 13 in the light path 123 of PC4 and (2) indication of a lack of any character having been detected in the field being scanned by scanner 73.

At this time (time 6), scanner 73 is turned OFF by the output from a control switching logic 129 appearing on line 131.

At junction point 132, the output signal on line 131 is fed via lead 133 into the "off" section of the scanner on-off control 116 which comprises conventional electronic switching in response to a signal on line 133. Accordingly, the signal on line 117 reverts to its earlier state thereby de-activating scanner 73 as indicated by the dashed line 134 (time 6).

The downwardly acting pressure on the card 13 applied by low speed balls 47 is then removed in order to be able to reversely feed the card quickly by means of the reversely turning scan wheels 64, 68 and, accordingly, it will be readily evident that PC4 lifts the low speed balls (chart in FIG. 7) as indicated by the step **104*a* (time 6) (the high speed balls then being in an elevated state) and then drops scan wheel 67 by de-energizing solenoid 69**.

This is accomplished by utilizing a signal from PC4 control logic 129 on line 136. The signal on line 136 can, for example, suitably serve to feed into an inhibit section in the low speed ball control logic 99 for overriding or switching the input provided by the PC2 control logic 97 on lead 98. In the above way, the coil for low speed balls 47 will be energized so as to lift low speed balls 47. Scan wheel 67 is then dropped by de-energizing solenoid 69 via an output signal state on line 130 inhibiting or switching the previous state of unit 108.

Ultimately, after giving the card time enough to have been returned, high speed balls 46 will be dropped by de-energizing electromagnet 48 and, accordingly, the PC4 signal from junction point 132 is fed to a delay means of conventional construction 137, such as a conventional one-shot multivibrator or other known time-delay device, whereby ultimately at time 9, high speed balls 46 will be dropped by de-energizing the high speed ball control unit 93. Thus, the output from delay means 137 serves to feed into high speed ball control 93 so as to switch it off after a predetermined delay has occurred.

The PC4 signal at junction point 132 serves the additional function of activating fingers 86 so as to move the card laterally of its earlier path whereby the card can then be later registered with registration edge 51 upon dropping of the high speed balls 46.

Accordingly, the PC4 control signal from junction point 132 is transmitted via line 138 to an AND gate 139 which, in the presence of a suitable control input on the second lead 141 of AND gate 139, will gate an output signal therethrough via lead 142 whereby a suitable delay means 143 of the above type ultimately provides a control pulse or signal on an output line 144.

The signal on line 144 in turn feeds into a finger-control switching circuit 146 so as to provide an activating pulse via lead 147 to operate solenoid 88 and thereby move fingers 86 laterally of the path of movement of card 13.

At the same time, an additional active output signal appears on output line 148 for initiating a delay function provided by the delay means 149 of suitable construction as described above. The output from delay means 149 is fed to a guide control switching arrangement 151 for providing an output state on a lead 152 for energizing guide solenoid 60 so as to lift registration edge 51 upwardly as shown best in FIG. 5.

The delay set into delay means 149 is understood to be sufficient to give fingers 86 time to urge card 13 sufficiently beyond the registration edge 51 so that upon lifting registration edge 51, the plane of the card will then be in position to intercept the longitudinal edge of card 13 in appropriate registration so as to align field 38 (the "top track") with scanning zone 63.

Further, the delay in means 143 is understood to be less than that of delay unit 137 whereby the high speed balls drop only after fingers 88 have functioned to move the card beyond edge 51.

Accordingly, at time 9, the high speed balls will drop at the end of their imparted delay and fence or guide element 50 will be activated to lift edge 51 upwardly.

As soon as high speed balls 46 drop, the card is quickly urged in its canted direction toward guide edge 51 and, upon registration, moves instantly forwardly along its direction of travel until the light path of PC2 is covered at time 10.

Entry of card 13 into light path 96 of PC2 again serves to lower the low speed balls 47, lift high speed balls 46, and then lift scan wheel 67 by energizing solenoid 69.

The foregoing function is achieved as hereinbefore noted by the outputs on leads 98, 101, and 107 leading respectively to the low speed ball control 99, high speed ball control logic 93 and scan wheel controls 108.

Subsequently, card 13 advances into the light path 111 of PC3 so as to effect the control previously explained relative to operating scanner 73 as indicated in chart 7 by the dashed line 153.

In the present instance with characters printed in field 38, there will be no control signal generated on the "no-character present" line 127 from scanner 73 and, accordingly, no AND function will be provided at the input side of AND gate 124 so as to maintain the PC4 control 129 in a dormant state where characters are detected.

Accordingly, card 13 proceeds onwardly through the path of the machine until such time as it enters the light path 154 and PC5 whereby PC5 control 156 is switched by the output of PC5 unit 45 to produce a switching signal on line 157 to operate the solenoid control means 158 of suitable construction for switching solenoid 74 into an energized state.

When solenoid 74 is energized, the exit wheels 77 are pivoted upwardly so as to pinch the card between follower rollers 83 and wheels 77. This serves to eject the card downstream in the direction of arrow 84 (FIG. 2).

The foregoing explanation serves to explain the operation of the system when operating in the mode described with respect to the chart shown in FIG. 7. At time 17, the PC5 control unit 156, while switching exit control unit 158 on lead 157, also serves to switch a system reset unit 159 via lead 161. Accordingly, an output on lead 162 from system reset 159 serves to provide an electrical state suitable for resetting all of the system in accordance with the conditions indicated at time 17.

Referring to the chart shown in FIG. 8, the mode of operation has been represented wherein a top track field 38 is first scanned and then, upon finding no data recorded therein, the card is repositioned and fed again whereby the center track field 37 can be scanned.

Initially, as indicated at time 1, PC1 indicates the presence of a card in the system as soon as it interrupts the light path associated with PC1. As noted above, PC1 control 91 becomes "latched" in an active state until being reset at the end of a cycle of operation, namely at time 17. PC1 serves, as before, to drop the high speed balls 46, and the remaining function and operation of the system is substantially as before with the exception, however, that control switch 95 has now been set to the "top track" position whereby its positive voltage source is coupled to lead 163 to provide an input to an AND gate 164, the other input being derived from line 138 so as to sense the state of the PC4 control unit 129.

However, an inverter 166 of conventional type and style wherein the state of an electrical signal arriving thereat is inverted to provide an inverse output on an output lead 167 is interposed between lead 138 and the AND gate 164.

Accordingly, the output of AND gate 164 appears on lead 168 in a manner to bypass unit 146 and solenoid 88 which otherwise previously controlled the activation of fingers 86.

It will be recalled that the state of PC4 control unit 129 is the result of the dual detection of (1) a card sensed by PC4 and (2) scanner 73 indicating the absence of characters in the first field being scanned. In the present instance where the top track is scanned first and no characters are present, it will be readily evident, from FIG. 5, that solenoid 60 will need to be maintained in an energized state while cards are first fed in registration with edge 51 and then de-energized so that the cards can be fed in registration with edge 52.

In order to maintain solenoid 60 in a continuously energized state until the condition indicated by the conjoint occurrence of the appearance of a card in light path 123 and a signal on lead 127, i.e., the PC4 control unit function, inverter 166 serves to invert the voltage or other signal state on line 138 whereby a conjoint input can appear on leads 163, 167 feeding AND gate 164.

This provides a suitable output on line 168 as before whereby control unit 151 will again be energized, but in the present instance substantially continuously. However, in the present instance when no character is detected as being present, the signal on line 127 and conjoint input from line 126 acting via AND gate 124 serve to reverse the state of the signal on line 138 and hence inverter 166 serves to provide the reverse function from that provided in the earlier mode thereby de-activating gate 164 whereby control unit 151 will de-energize solenoid 60 permitting guide element 50 to pivot clockwise about the axis defined by pivot pins 55. Ultimately, registration edge 52 will drop to position to receive a card, reversely fed as before with the exception of the activation of fingers 86, so as to permit scanning of the center track field 37. Scanning of field 37 proceeds as above described whereby ultimately light path 154 of PC5 is intercepted and exit wheels 77 are activated to cooperate with wheels 83 thereby ejecting card 13 from the path of movement.

The charts shown in FIGS. 9 and 10 represent the sequence of events involved in scanning a card via the center track field 37, finding data in that field and hence providing no re-scanning of the card. FIG. 10 provides a chart of the mode of operation wherein the top track field 38 is scanned and characters are detected with no subsequent re-scanning being necessary. Accordingly, neither of these two charts is believed to require further explanation of the system of FIG. 6 in the light of the extensive explanation appearing above.

From the foregoing, it will be readily evident that there has been provided a system for feeding data cards via a sensing means for detecting data and reading same in a manner serving to accommodate the problem of otherwise having to pre-sort all cards into categories as to which line the data has been recorded.

I claim:

1. In a card transport apparatus for feeding data cards along a predetermined path including therein means for sensing data in one of a plurality of lines extending in the direction of the path, means for feeding a data card along said path with one of said lines in registration with said sensing means, means for feeding said card reversely along said path subsequent to sensing at least a portion of said one line, means for repositioning said card to align another of said lines in registration with said sensing means, and means for re-feeding said card along said path for sensing data in the last named line.

2. In a card transport for feeding data cards along a path and including therein means to sense the data carried by the card, and where the card includes a plurality of fields extending across a portion of the card for containing data therein, means for feeding a card to register one of said fields in said path for sensing the data in said one field, means for detecting the presence or absence of data in said one field, means responsive to sensing the absence of data by the last named means and serving to re-feed said card with the other of said fields in registry with said path for said sensing means to detect data in said other field.

3. In a card transport according to claim 2 wherein the means for re-feeding the card includes means for feeding said card reversely along said path, means for repositioning the card to align the other of said fields in registry with said path and means for feeding the card thus aligned via said sensing means to detect data in said other field.

4. The method of scanning data cards to detect information carried in a plurality of lines comprising the steps of feeding the data card in a direction of one of said lines while registering an edge of the card with a guide element disposed to align said one line with means for sensing data in said line, repositioning said guide element to a position disposed to align another line with said sensing means, and re-feeding the card in the direction of the last named line while registering an edge of the card with the repositioned guide element.

5. In a card transport apparatus for feeding data cards along a predetermined path including therein means for sensing data in one of a plurality of lines, means including a guide element movable between advanced and retracted positions serving to register data of a line of said data card with said sensing means, and means for moving the card via said sensing means to read data in said line, means for reversely feeding said data card along said path and for switching the condition of said guide element from one position to another for registering data of another line of said data card with said sensing means, said means for moving said card serving to feed the last named line via said sensing means to read data from the last named line.

* * * * *